United States Patent
Weisfelner

(10) Patent No.: US 10,988,258 B2
(45) Date of Patent: Apr. 27, 2021

(54) CARGO RESTRAINT SENSOR SYSTEM

(71) Applicant: The Boeing Company, Chicago, IL (US)

(72) Inventor: Justin Louis Weisfelner, Everett, WA (US)

(73) Assignee: The Boeing Company, Chicago, IL (US)

( * ) Notice: Subject to any disclaimer, the term of this patent is extended or adjusted under 35 U.S.C. 154(b) by 579 days.

(21) Appl. No.: 15/956,669

(22) Filed: Apr. 18, 2018

(65) Prior Publication Data

US 2019/0322369 A1    Oct. 24, 2019

(51) Int. Cl.
*G08B 21/00* (2006.01)
*B64D 9/00* (2006.01)
(Continued)

(52) U.S. Cl.
CPC ............ *B64D 9/003* (2013.01); *B65D 88/14* (2013.01); *B65D 90/006* (2013.01); *G08B 5/223* (2013.01); *G01M 1/125* (2013.01)

(58) Field of Classification Search
CPC ............ B60R 2325/304; B60R 25/104; B60R 25/1001; B60R 25/1004; B60R 2025/1013; B60R 2025/1016; B60R 2325/205; B60R 25/018; B60R 25/04; B60R 25/1003; B60R 25/1018; B60R 25/102; B60R 25/20; B60R 25/24; G08B 25/009; G08B 13/19647;
(Continued)

(56) References Cited

U.S. PATENT DOCUMENTS 3,796,397 A    3/1974 Alberti
5,871,317 A *  2/1999 Huber ................... B64D 9/003
                                                    410/69
(Continued)

FOREIGN PATENT DOCUMENTS

EP    2899124 A1    7/2015
EP    3190047 A1    7/2017

OTHER PUBLICATIONS

Powercast Co., Powercast FCC/ISED Approved PowerSpot® Transmitter, Jan. 8, 2007, retrieved from internet: http://www.powercastco.com/products/powerspot/, retrieved on Apr. 3, 2018, 7 pages.
(Continued)

*Primary Examiner* — Daniel Previl
(74) *Attorney, Agent, or Firm* — Kolisch Hartwell, P.C.

(57) ABSTRACT

A cargo restraint system and associated methods may include sensing assemblies associated with cargo latches in a cargo hold of an aircraft. In some embodiments, the sensing assemblies include sensors configured to sense information relating to the cargo latches, wireless communication circuits configured to transmit the sensed information to a central controller, and batteries powering the wireless communication circuits. A wireless power transmission system may be configured to wirelessly broadcast power to the sensor assemblies to charge the batteries. In some embodiments, the cargo latches are transitionable between an extended configuration for cargo restraint and a retracted configuration for cargo loading and unloading, and the sensors are configured to sense whether the cargo latches are in the extended configuration.

20 Claims, 8 Drawing Sheets

(51) Int. Cl.
    *B65D 88/14* (2006.01)
    *B65D 90/00* (2006.01)
    *G08B 5/22* (2006.01)
    *G01M 1/12* (2006.01)

(58) Field of Classification Search
    CPC .. G08B 13/19697; G08B 17/00; G08B 21/22;
         G08B 31/00; G08B 13/1409; G08B
         13/2491; G08B 15/00; G08B 21/12;
         G08B 23/00; G08B 5/223; B60H 1/32;
         B60H 1/3202; B60H 1/00014; B60H
         1/00964; B60Q 1/305; B60Q 11/00; F24F
         11/30; F24F 11/52; F24F 2110/00; F25D
         29/001; G07C 5/085; G07C 5/0891;
         G07C 9/257; G07C 9/28; G07C
         2009/0092; G07C 9/00174; G07C
         9/00563; G07C 9/00912; G07C 9/20;
         H04K 2203/16; H04K 2203/22; H04K
         2203/24; H04K 3/226; H04K 3/28; H04K
         3/41; H04K 3/45; H02J 50/00; H02J
         50/001; H02J 50/20; H02J 50/90; H02J
         7/025; H04W 4/80; B64C 2201/128;
         B64D 9/003; B65D 88/14; B65D 90/006;
         G01M 1/125; G06F 16/5838; G06K
         19/0707; G06K 9/00221; G06K 9/00288;
         G06K 9/00677; G06K 9/00979; G06Q
         10/08; G06Q 10/0833; H01Q 1/243;
         H01Q 1/248; H04B 10/807; H04B
         1/1607; H04L 12/18; H04L 12/185; H04L
         51/32; H04L 65/403; H04N 21/44218;
         H04N 5/23203; H04N 5/23219

USPC .... 340/500, 426, 542, 545.1, 945, 960, 431,
                                                340/687
    See application file for complete search history.

(56) References Cited

U.S. PATENT DOCUMENTS

| | | | |
|---|---|---|---|
| 6,454,210 B1* | 9/2002 | Plattner | B64C 1/1415 244/129.5 |
| 2003/0038713 A1* | 2/2003 | Plude | B64C 1/14 340/426.1 |
| 2011/0273313 A1* | 11/2011 | Hettwer | B64D 9/00 340/945 |
| 2012/0261981 A1 | 10/2012 | Paul | |
| 2013/0166063 A1 | 6/2013 | Panzram et al. | |
| 2013/0340444 A1* | 12/2013 | Bryant | B60H 1/00964 62/62 |
| 2014/0077034 A1* | 3/2014 | Woodland | B64D 11/0616 244/122 R |

OTHER PUBLICATIONS

Wi-Charge to Power With Light, Jan. 21, 2010, retrieved from internet http://www.wi-charge.com/products/, retrieved Apr. 3, 2018, 2 pages.

Williams Sound, WIR TX75 D, Jun. 26, 1998, retrieved from internet: https://www.williamssound.com/catalog/wir-tx75-d, retrieved on Apr. 6, 2018, 2 pages.

European Patent Office, Extended European Search Report regarding European Patent Application No. 19169365.4-1010, dated Aug. 8, 2019, 6 pages.

* cited by examiner

CARGO RESTRAINT SENSOR SYSTEM

FIELD

This disclosure relates to systems and methods for restraining cargo in an aircraft cargo compartment.

INTRODUCTION

Aircraft cargo restraint systems secure cargo in an aircraft cargo compartment, such as the cargo hold of a passenger aircraft or cargo aircraft. A cargo restraint system prevents cargo from shifting during flight, which could change the center of gravity of the aircraft. If any component of the cargo restraint system is not properly engaged, the ability of the system to secure cargo could be compromised. For example, many cargo restraint systems include latches that are configurable to restrain pallets or other containers. It is desirable for aircraft personnel to be able to confirm that all of the cargo latches in the compartment are configured correctly. However, in existing aircraft cargo restraint systems, the configuration of the cargo latches must be checked manually, which is time-consuming and may be impossible after cargo has been loaded into the compartment.

SUMMARY

The present disclosure provides systems, apparatuses, and methods relating to cargo restraint systems. In some embodiments, a cargo restraint system may include a plurality of cargo latches, each of the plurality of cargo latches mounted to a same floor of a cargo hold of an aircraft and including a respective pawl transitionable between an extended configuration and a retracted configuration; a plurality of sensing assemblies, each of the plurality of sensing assemblies associated with a respective one of the plurality of cargo latches, wherein each of the plurality of sensing assemblies includes one or more sensors and a wireless communication circuit powered by a battery in communication with a battery charging circuit, the wireless communication circuit configured to transmit sensed information relating to the associated cargo latch; an infrared transmitter disposed in the cargo hold and configured to illuminate the plurality of sensing assemblies with an infrared signal; and a central controller configured to receive transmissions from each wireless communication circuit of the plurality of sensing assemblies and, in response, to produce human-perceptible information associated with each of the cargo latches; wherein each battery charging circuit of each of the sensing assemblies has an infrared receiver portion configured to convert the infrared signal from the infrared transmitter into an electric current usable to charge the battery.

In some embodiments, a method may include sensing information related to a plurality of cargo latches, each of the plurality of cargo latches mounted to a same floor of a cargo hold of an aircraft and including a respective pawl transitionable between an extended configuration and a retracted configuration, using a plurality of sensing assemblies each associated with one of the cargo latches; illuminating the plurality of sensing assemblies with an infrared signal, using an infrared transmitter disposed in the cargo hold; converting the infrared signal from the infrared transmitter into an electric current usable to charge a respective battery of each of the plurality of sensing assemblies; receiving a wireless transmission from each of the plurality of sensing assemblies, each transmission including sensed information relating to the associated cargo latch; and in response to receiving the wireless transmission, producing human-perceptible information associated with each of the plurality of cargo latches at a central control station.

In some embodiments, a cargo restraint system may include a plurality of cargo latches, each of the plurality of cargo latches mounted to a same floor of an aircraft cargo hold; a plurality of sensing assemblies, each of the plurality of sensing assemblies associated with a respective one of the plurality of cargo latches, wherein each of the plurality of sensing assemblies includes one or more sensors and a wireless communication circuit powered by a battery in communication with a battery charging circuit, the wireless communication circuit configured to transmit sensed information relating to the associated cargo latch; and an infrared transmitter disposed in the cargo hold and configured to illuminate the plurality of sensing assemblies with an infrared signal; wherein each of the battery charging circuits of each of the plurality of sensing assemblies has an infrared receiver portion configured to convert the infrared signal from the infrared transmitter into an electric current usable to charge the battery.

Features, functions, and advantages may be achieved independently in various embodiments of the present disclosure, or may be combined in yet other embodiments, further details of which can be seen with reference to the following description and drawings.

DETAILED DESCRIPTION

Figure 1:
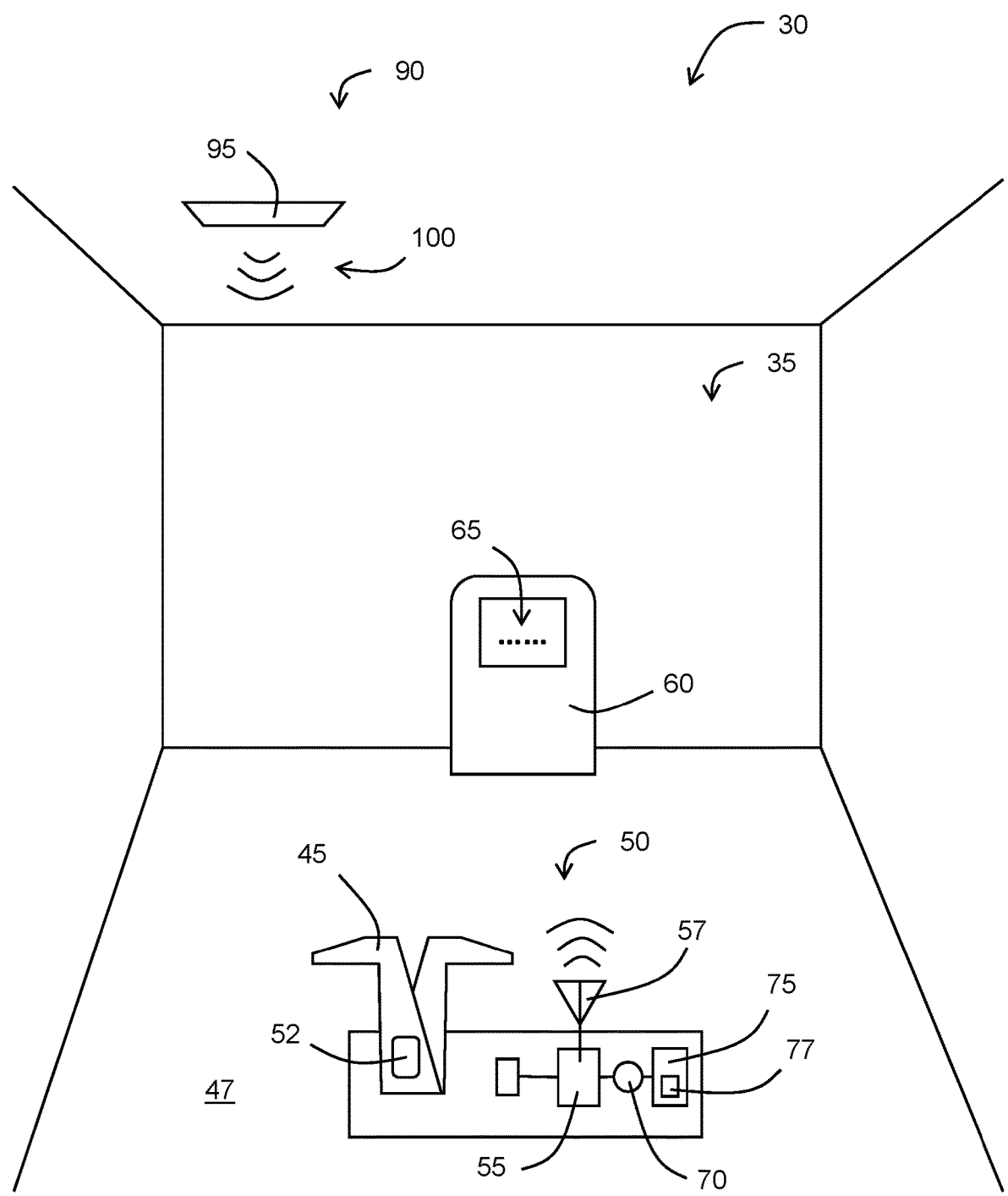
FIG. 1 is a schematic diagram of an illustrative cargo restraint system in accordance with aspects of the present disclosure.

Various aspects and examples of a cargo restraint system having sensing assemblies associated with floor-mounted cargo latches, as well as related methods, are described below and illustrated in the associated drawings. Unless otherwise specified, a cargo restraint system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion. The Examples, Components, and Alternatives section is further divided into subsections A through F, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

The terms "inboard," "outboard," "forward," and "aft" (and the like) are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" means toward the rear of the vehicle. In the absence of a host vehicle, the same directional terms may be used as if the vehicle were present. For example, even when viewed in isolation, a crossbar may have a "forward" edge, based on the fact that the crossbar would be installed with the edge in question facing in the direction of the front portion of the host vehicle.

"Coupled" means connected, either permanently or releasably, whether directly or indirectly through intervening components, and is not necessarily limited to physical connection(s).

Overview

In general, systems and methods of the present disclosure are configured to provide real-time information about an aircraft cargo system. For example, a cargo restraint system 30 (see FIG. 1) may be used to sense information related to cargo restraint latches in an aircraft cargo hold, and to transmit the sensed information to a central controller for use by aircraft personnel.

Figure 4:
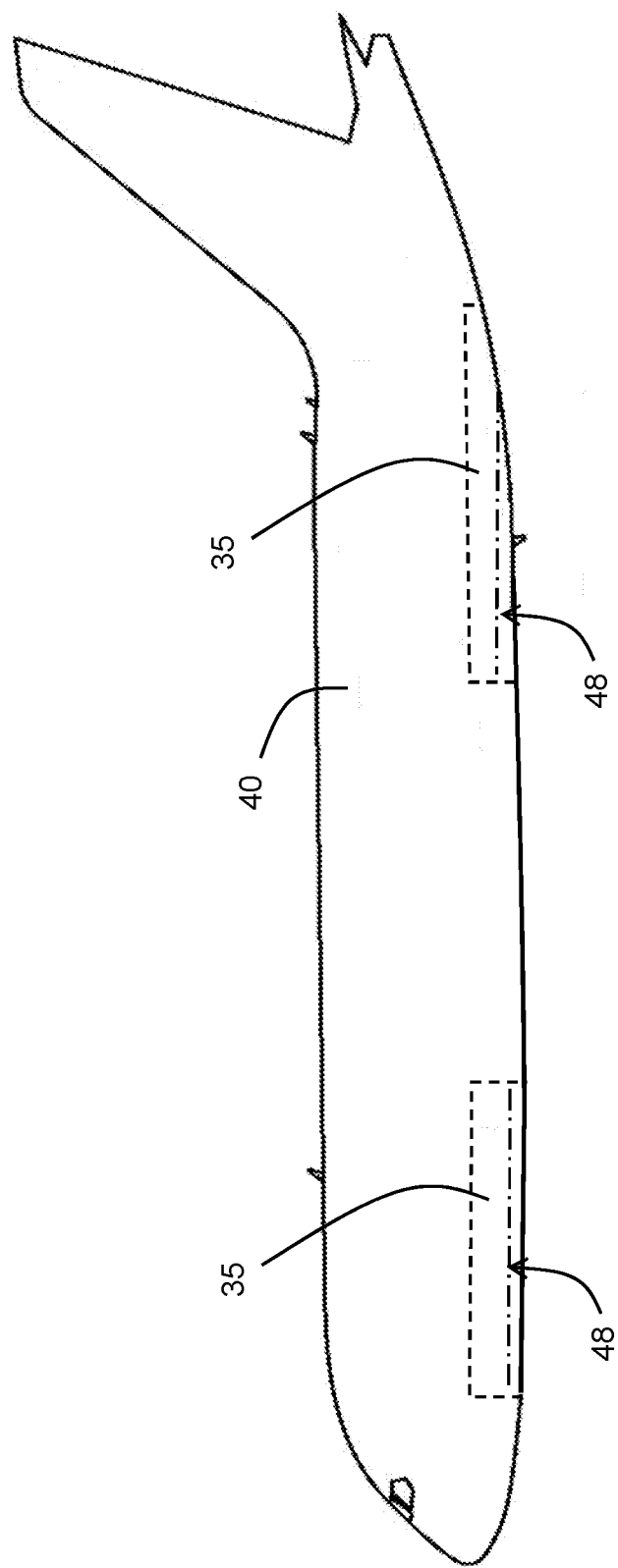
FIG. 4 is a schematic diagram depicting illustrative cargo holds in the aircraft of FIG. 3.

With continuing reference to FIG. 1, cargo restraint system 30 is configured to secure cargo in a desired position within cargo hold 35. Cargo hold 35, which may also be referred to as a cargo compartment or cargo space, is an internal room or area in aircraft 40 (see, e.g., FIG. 4) in which pallets, unit load devices (ULDs), or other cargo may be stored.

Cargo restraint system 30 may include latches 45 (also referred to as locks) mounted on a floor 47 of cargo hold 35. Typically, latch 45 is transitionable between an extended configuration, in which the latch prevents movement of a cargo container in one or more directions, and a retracted configuration, in which the latch allows a container to move (e.g., so that the container may be loaded into or removed from cargo hold 35). Cargo containers within cargo hold 35 move along a conveyance plane 48 (see FIGS. 4 and 6), which is a plane substantially parallel to and/or coplanar with large portions of floor 47. In the extended configuration, cargo latch 45 is raised above conveyance plane 48 of cargo hold 35, and in the retracted configuration, the cargo latch is retracted below the conveyance plane. Cargo latch 45 may be configured to be fixed or locked in the extended configuration, such that the latch remains extended until manually retracted. For example, locking mechanisms such as springs and detents may be configured to prevent latch 45 from transitioning from the extended configuration to the retracted configuration. If latch 45 fails to remain in the extended configuration—due, for example, to damage or debris in the locking mechanism—then the latch may be unable to prevent undesired movement of a cargo container. Each latch 45 could be manually inspected for proper configuration during the cargo loading process. However, this is time-consuming given the large number of latches in a typical cargo hold. Additionally, it is difficult or impossible to inspect some or all of latches 45 in areas of cargo hold 35 where cargo has already been loaded.

Cargo restraint system 30 includes sensing assemblies 50 associated with floor-mounted cargo latches 45. Sensing assemblies 50 are disposed on or adjacent cargo latches 45 and include one or more sensors 52 configured to sense information relating to the latches and/or other aspects of the aircraft cargo system. For example, sensors 52 may be configured to sense whether the associated cargo latch 45 is in the extended and/or retracted configuration. Additionally, or alternatively, sensing assemblies 50 may include sensors 52 configured to detect smoke, heat, water, or other hazards. Each sensing assembly 50 further includes a wireless communication circuit 55 configured to transmit the sensed information (e.g., using an antenna 57) to a central controller or control station 60, where the information may be presented to aircraft personnel. For example, the central controller may include an output device configured to format the sensed information in a human-readable or otherwise human-perceptible (e.g., audio) format and produce it as human-perceptible information 65. Audible formats may include an alarm, a tone, a voice alert, etc.

Central controller 60 is depicted in FIG. 1 as being disposed within cargo hold 35. However, central controller 60 may be located in any suitable portion of aircraft 40 (e.g., the cockpit), and in some examples may be portable. Central controller 60 may comprise a computer, tablet, smartphone, and/or other mobile digital device. Central controller 60 may be configured to re-transmit the sensed information to another portion of the aircraft and/or to one or more mobile digital devices.

One or more components of each sensing assembly 50 (e.g., wireless communication circuit 55) may be coupled to a power source. Hardwiring power to each device (i.e., using electrical wires) is undesirable for several reasons. For example, the large number of cargo latches 45 in a typical hold would require a large amount of electrical wiring, which would add weight to aircraft 40, necessitate running wires to the cargo hold 35 (e.g., underneath a large portion of cargo hold floor 47), and make it difficult to reposition latches 45 within cargo hold 35 or to add new latches 45. To avoid these difficulties, sensing assemblies 50 are each powered by a respective battery 70. Each battery 70 is charged in situ via a battery-charging circuit 75, which includes a receiver portion 77 configured to receive power wirelessly from a wireless power transmission system 90.

Wireless power transmission system 90 of cargo restraint system 30 includes at least one wireless transmitter 95 mounted in the cargo hold. Wireless power transmitter 95 is configured to broadcast to sensing assemblies 50 a wireless power signal 100. Wireless power signal 100 is received by receiver portion 77 of each battery-charging circuit 75, which converts the wireless power signal into an electrical current and uses the electrical current to charge battery 70. Wireless power transmitter 95 is mounted in cargo hold 35 (e.g., to a ceiling or wall of the cargo hold) and receives power from wired electrical system 110 (see FIG. 8) of aircraft 40. Typically, wireless power transmitter 95 is powered when aircraft 40 is on the ground, before cargo hold 35 is fully loaded, because cargo containers would at least partially block wireless power signal 100 and limit, slow, and/or prevent the charging of battery 70. Therefore, power may be supplied to wireless power transmitter 95 from a ground-based electrical system 115 via wired aircraft electrical system 110. Alternatively, or additionally, power may be supplied to wireless power transmitter 95 from another portion of aircraft electrical system 230 (see FIG. 3). Having been at least partially charged, batteries 70 continue to provide power to wireless communication circuits 55 of sensing assemblies 50 after cargo is loaded, and may provide power during and after the flight of aircraft 40. Sensing assemblies 50 therefore may provide real-time information on the status of cargo latches 45, in some cases, including after cargo is loaded and aircraft 40 is in the air.

EXAMPLES, COMPONENTS, AND ALTERNATIVES

The following sections describe selected aspects of exemplary cargo restraint systems, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Aircraft and Associated Method

Figure 3:
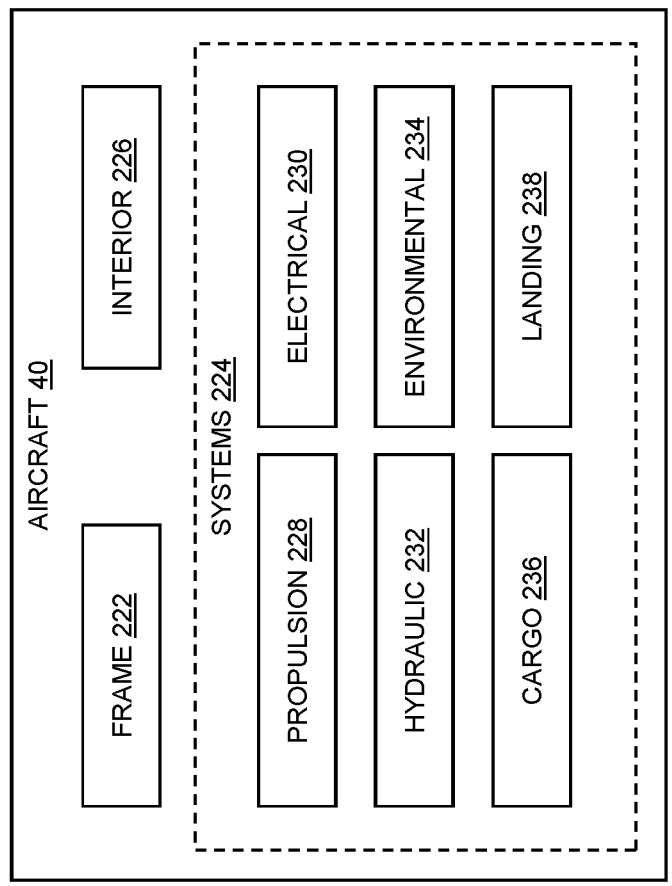
FIG. 3 is a schematic diagram depicting systems of an illustrative aircraft according to the present teachings.
Figure 2:
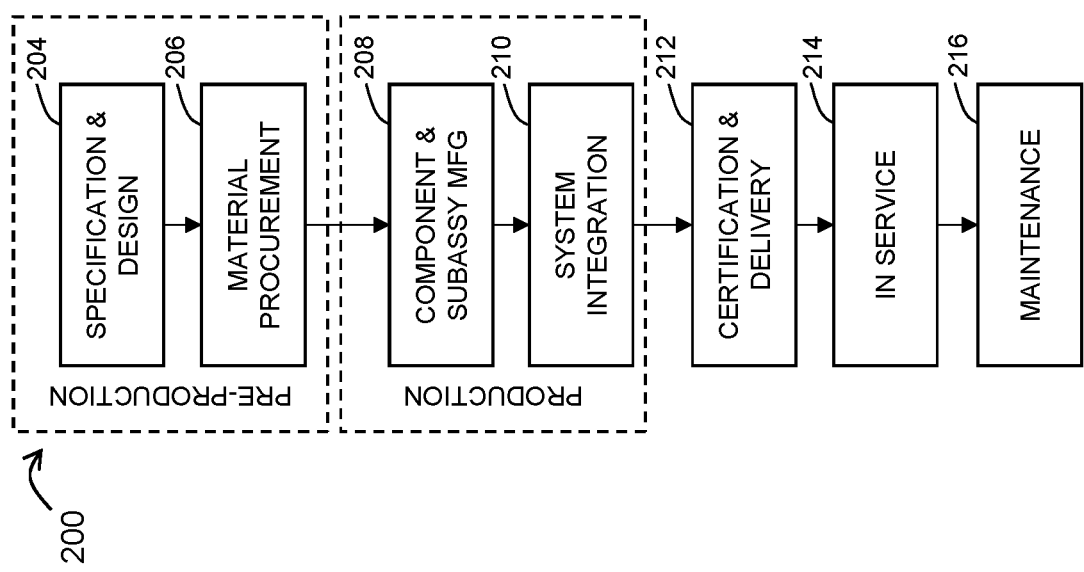
FIG. 2 is a flow chart depicting steps of an illustrative method for aircraft manufacture and service according to the present teachings.

Examples disclosed herein may be described in the context of an illustrative aircraft manufacturing and service method 200 (see FIG. 2) and an illustrative aircraft 40 (see FIG. 3). Method 200 includes a plurality of processes, stages, or phases. During pre-production, method 200 may include a specification and design phase 204 of aircraft 40 and a material procurement phase 206. During production, a component and subassembly manufacturing phase 208 and a system integration phase 210 of aircraft 40 may take place. Thereafter, aircraft 40 may go through a certification and delivery phase 212 to be placed into in-service phase 214. While in service (e.g., by an operator), aircraft 40 may be scheduled for routine maintenance and service 216 (which may also include modification, reconfiguration, refurbishment, and so on of one or more systems of aircraft 40). While the embodiments described herein relate generally to operational use during in-service phase 214 of aircraft 40, they may be practiced at other stages of method 200.

Each of the processes of method 200 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 3, aircraft 40 produced by illustrative method 200 may include a frame 222 with a plurality of systems 224 and an interior 226. Examples of plurality of systems 224 include one or more of a propulsion system 228, an electrical system 230 (which may include wired electrical system 110), a hydraulic system 232, an environmental system 234, a cargo system 236, and a landing system 238. Each system may comprise various subsystems, such as controllers, processors, actuators, effectors, motors, generators, etc., depending on the functionality involved. Any number of other systems may be included. Although an aerospace example is shown, the principles disclosed herein may be applied to other industries, such as the automotive industry, rail transport industry, and nautical engineering industry. Accordingly, in addition to aircraft 40, the principles disclosed herein may apply to other vehicles, e.g., land vehicles, marine vehicles, etc.

Cargo system 236 of aircraft 40 includes one or more cargo holds 35. As illustrated schematically in FIG. 4, cargo holds 35 may be disposed on a lower deck of aircraft 40 to facilitate the loading of cargo into the cargo holds 35 when the aircraft 40 is on the ground. Cargo holds 35 may be disposed in a forward region of aircraft 40, an aft region of the aircraft 40, or in any other suitable region of the aircraft 40. Cargo system 236 may include various subsystems such as cargo loading systems and cargo restraint systems. Cargo restraint system 30 is a subsystem of cargo system 236.

Apparatuses and methods shown or described herein may be employed during any one or more of the stages of the manufacturing and service method 200. For example, components or subassemblies corresponding to component and subassembly manufacturing phase 208 may be fabricated or manufactured in a manner similar to components or subassemblies produced while aircraft 40 is operating during in-service phase 214. Also, one or more examples of the apparatuses, methods, or combinations thereof may be utilized during production stages 208 and 210, for example, by substantially expediting assembly of or reducing the cost of aircraft 40. Similarly, one or more examples of the apparatus or method realizations, or a combination thereof, may be utilized, for example and without limitation, while aircraft 40 is in in-service phase 214 and/or during maintenance and service phase 216.

B. Illustrative Latch

Figure 5:
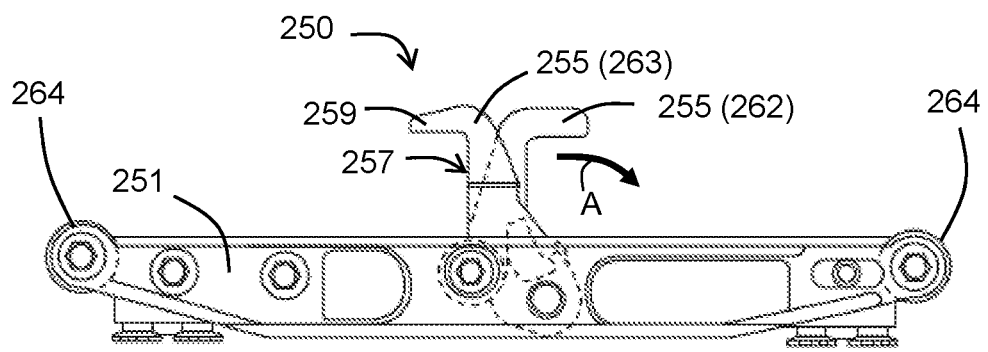
FIG. 5 is a side view of an illustrative cargo latch in an extended configuration for cargo restraint, in accordance with aspects of the present teachings.
Figure 6:
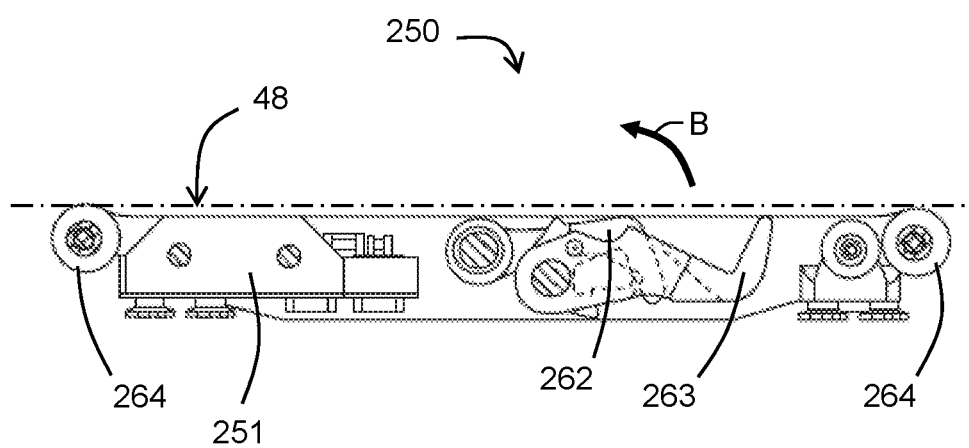
FIG. 6 is a side view of the cargo latch of FIG. 5 in a retracted configuration.
Figure 7:
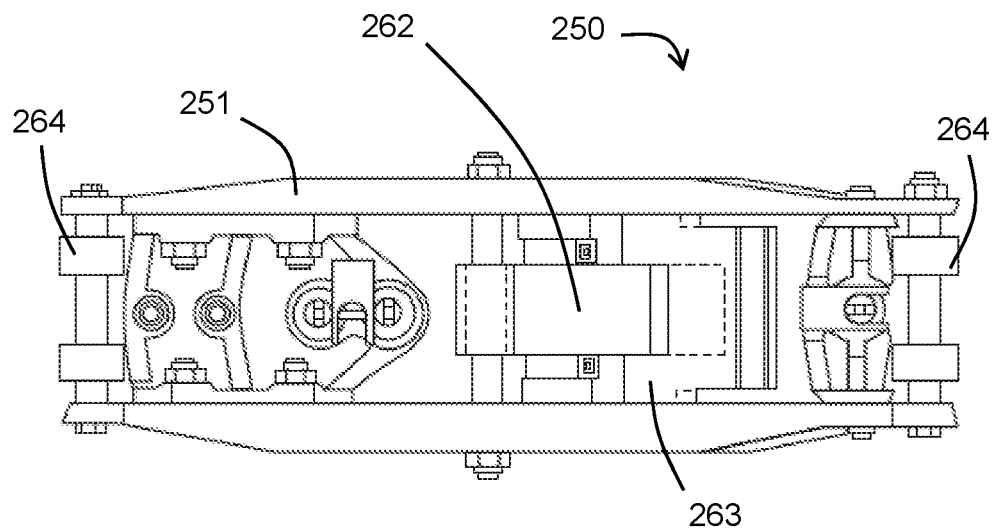
FIG. 7 is a top view of the cargo latch of FIGS. 5-6 in a retracted configuration.

As shown in FIGS. 5-7, this section describes an illustrative baseplate latch 250. Baseplate latch 250 is an example of cargo latch 45, described above. Baseplate latch 250 is mounted to floor 47 of cargo hold 35, either directly or via a latch frame 251. Baseplate latch 250 includes at least one pawl 255 configured to engage a baseplate or flange of a cargo container (e.g., a pallet, crate, ULD, or the like), thereby restraining the container. Pawl 255 includes a wall 257 configured to engage a vertical edge of a cargo container baseplate and a lip 259 configured to engage an upper surface of the cargo container baseplate, or to be received in a recess or pocket in the container. Wall 257 and lip 259 may form a substantially right angle shaped to receive the cargo container baseplate, and may be collectively referred to as a hook.

Pawl 255 is transitionable between an extended configuration (see FIG. 5) and a retracted configuration (see FIG. 6). In the extended configuration, pawl 255 projects above floor 47 of cargo hold 35 to engage with a cargo container. Wall 257 forms a substantially right angle with floor 47 when pawl 255 is in the extended configuration. In the retracted configuration, pawl 255 is contained within floor 47 or latch frame 251 such that the pawl does not impede movement of a cargo container passing over baseplate latch 250. Pawl 255 may transition between the extended configuration and the retracted configuration by pivoting about a bolt or pin of latch frame 251. Pawl 255 may be locked in the extended configuration by operation of a locking mechanism such as detents and/or springs.

Any suitable baseplate latch may be utilized. In some examples, baseplate latch 250 includes two pawls 255. For example, baseplate latch 250 may comprise a so-called XZ latch and/or a scissor lock, and may include an inner pawl 262 and an outer pawl 263. Inner pawl 262 and outer pawl 263 are mounted pivotably between rails of latch frame 251 such that the inner and outer pawls are oriented in opposing directions when the pawls are in the extended configuration (see FIG. 5). That is, respective lips 259 of inner pawl 262 and outer pawl 263 project in substantially opposite directions when the pawls are in the extended configuration. In the retracted configuration, both inner pawl 262 and outer pawl 263 are substantially contained within latch frame 251 (see FIGS. 6-7).

Baseplate latch 250 may be transitioned from the extended configuration to the retracted configuration by rotating both inner pawl 262 and outer pawl 263 in the direction indicated by arrow A in FIG. 5. In the extended configuration, a portion of inner pawl 262 passes through an opening in outer pawl 263, which is wider than the inner pawl. Rotating outer pawl 263 in the direction of arrow A brings outer pawl 263 into contact with inner pawl 262, such that both pawls are rotated into the retracted configuration. Baseplate latch 250 may be transitioned from the retracted configuration to the extended configuration by rotating inner pawl 262 and outer pawl 263 in the direction indicated by arrow B in FIG. 6. During rotation of outer pawl 263 from the retracted configuration to the extended configuration, a distal end portion of inner pawl 262 passes through the opening in the outer pawl 263, and inner pawl 262 is engaged by outer pawl 263, such that the inner pawl 262 is rotated into the extended configuration along with the outer pawl 263. In other words, rotating outer pawl 263 into the extended configuration causes outer pawl 263 to automatically urge inner pawl 262 into the extended configuration. Baseplate latch 250 may include a locking mechanism configured to automatically lock inner pawl 262 and outer pawl 263 in the extended configuration until the locking mechanism is manually overcome.

In some examples, cargo hold 35 includes floor-mounted arrays or rows of baseplate latches 250, with inner and outer pawls 262 and 263 oriented along the rows such that adjacent baseplate latches may restrain a same cargo container. Cylindrical rollers 264 (see FIGS. 5-7) may be mounted rotatably on one or more latch frames 251. Rollers 264 project above latch frames 251 and are configured to facilitate translation of cargo containers along floor 47 (e.g., along conveyance plane 48) when baseplate latches 250 are in the retracted configuration.

Alternatively or additionally, cargo latches 45 may include one or more other types of latches. For example, a so-called butterfly latch may be used. Typically, butterfly latches have two pawls hinged to one another at their distal ends and mounted pivotably to the latch frame at their proximal ends. The distal ends include hooks (e.g., lips and walls) configured to retain cargo items. The proximal ends are mounted pivotably between rails of the latch frame, and are configured to slide toward and away from each other within the frame. Sliding the proximal ends of the pawls within the frame changes the angle subtended by the two pawls at their hinged distal connection. Butterfly latches may be transitioned to a retracted configuration by sliding the proximal ends of the pawls away from each other such that the subtended angle is large (e.g., approximately 180°) and the pawls are substantially contained within the latch frame. The butterfly latch may be transitioned to an extended configuration by sliding the proximal ends of the pawls toward each other, such that the subtended angle is decreased relative to the angle subtended in the retracted configuration, and the pawls project above the latch frame.

C. Illustrative Sensing Assembly

Figure 8:
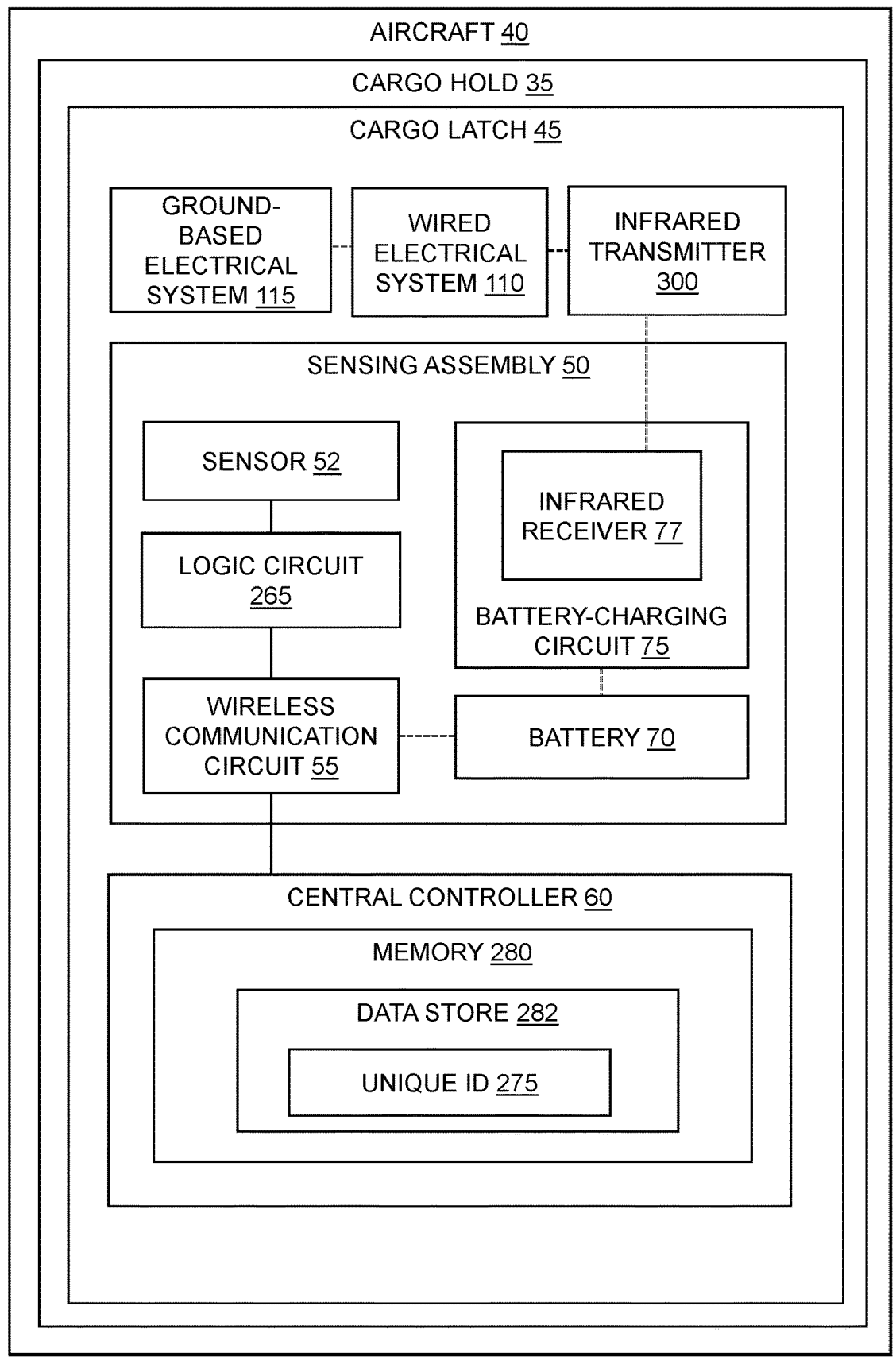
FIG. 8 is a schematic diagram of an illustrative sensing assembly, wireless power transmission system, and central controller as described herein.
Figure 9:
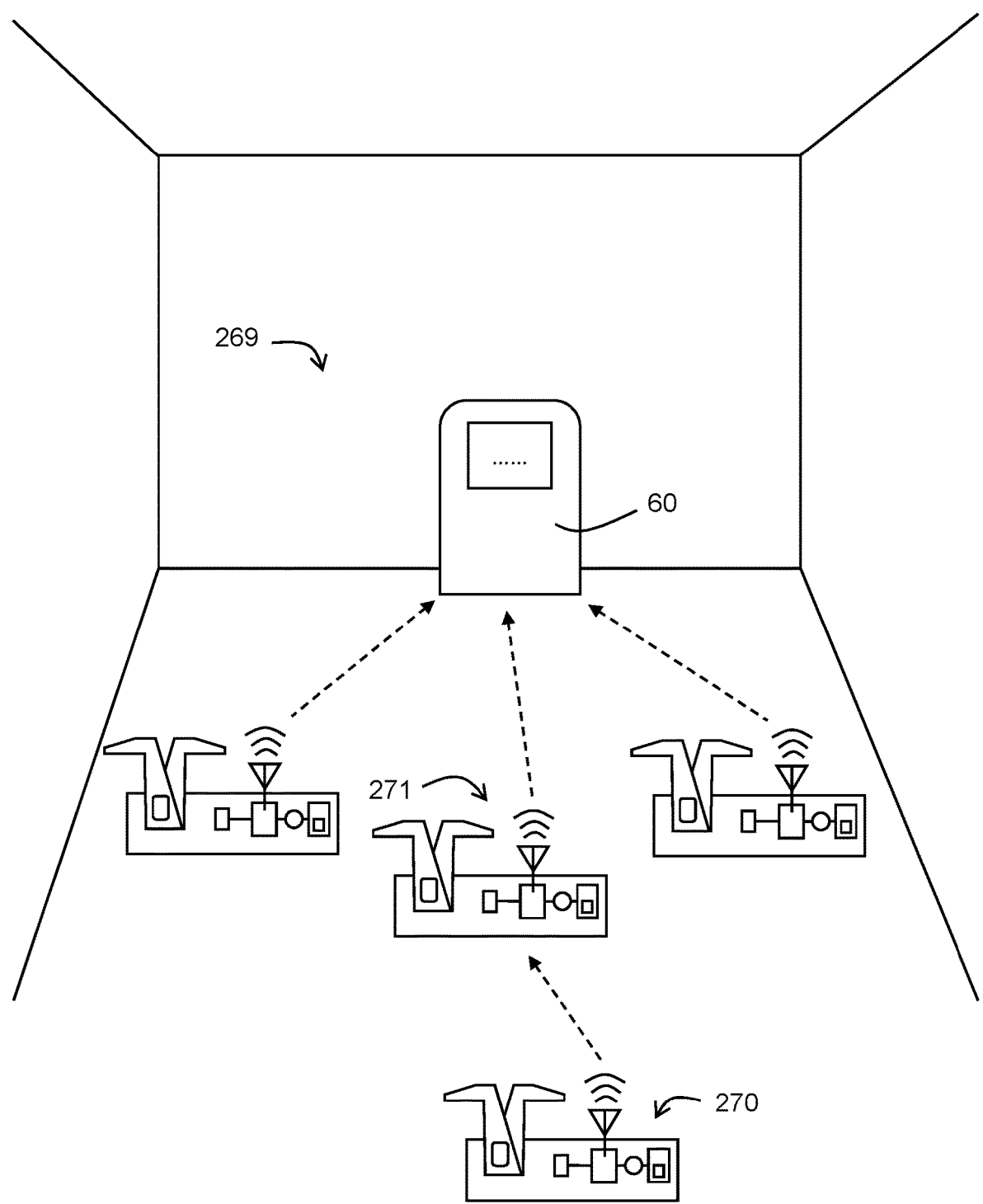
FIG. 9 is a schematic diagram of an illustrative mesh network of wireless communication circuits associated with cargo latches, according to aspects of the present teachings.

As shown in FIGS. 8-9, this section describes an illustrative sensing assembly 50 for use in cargo restraint system 30.

Illustrative sensing assembly 50 includes one or more sensors 52 configured to sense information related to cargo latch 45. For example, one of the sensors 52 may be configured to sense information related to the configuration of cargo latch 45 (e.g., whether the cargo latch is in the extended or retracted configuration.) For example, sensor 52 may be a proximity sensor configured to sense whether one or more pawls 255 of baseplate latch 250 are in a position (relative to another pawl or to latch frame 251) that corresponds to the extended configuration. That is, sensor 52 may detect that a portion of one of the pawls 255 is proximate a portion of the other pawl, and/or is proximate a portion of latch frame 251. Sensor 52 may be configured to produce a signal indicating whether a distance between pawls 255, and/or between one or both pawls and latch frame 251, is above or below a predetermined threshold distance. An above-threshold distance between certain components of cargo latch 45 (e.g., a large distance between certain portions of inner pawl 262 and outer pawl 263) may indicate that the cargo latch is not correctly configured in the extended configuration. Suitable proximity sensors may include magnetic Hall sensors, magnetoresistive sensors, inductive sensors, capacitive sensors, optical sensors, mechanical switches, and the like. For example, sensor 52 may be a magnetic Hall effect sensor, and pawl 255, latch frame 251, or any other suitable component of cargo latch 45 may include a magnet or a ferromagnetic material detectable by the sensor. Sensor 52 may be disposed in and/or on latch frame 251, pawl 255, or in any other suitable component of cargo latch 45.

In some examples, sensor 52 is configured to sense engagement of a locking mechanism configured to lock cargo latch 45 in an extended configuration. For example, cargo latch 45 may include a detent boss and detent opening positioned such that the boss is urged into the opening (by a spring or other biasing mechanism) when the cargo latch is in the extended configuration. Sensor 52 may be a proximity sensor configured to sense the presence of the boss within the opening. Additionally or alternatively, sensor 52 may be configured to sense the magnitude of a force applied by springs or other biasing mechanisms within the locking mechanism, and information sensed by the sensor may be used to detect failures of the locking mechanism.

Additionally or alternatively, one or more sensors 52 may be configured to sense the presence of water or humidity. Water or high humidity levels may indicate the ingress of water into cargo hold 35, a leak in a fluid system of aircraft 40, a leaking cargo container, and/or the like. Additionally or alternatively, one or more sensors 52 may be configured to sense smoke, oxygen levels, hazardous gas, fuel leaks, temperature, air pressure, and/or other (e.g., environmental) aspects of cargo hold 35.

Sensors 52 each include a transducer configured to respond to a stimulus from a physical system (e.g., cargo latches 45 and/or cargo hold 35), and to produce an electrical signal corresponding to the stimulus, e.g., representing information about the system. For example, each sensor 52 may produce a voltage level corresponding to a sensed proximity, a sensed temperature, a sensed amount of smoke, presence of water, etc. In some examples, the voltage level varies linearly or nonlinearly with the sensed quantity (e.g., a sensed distance from sensor 52 to a component of cargo latch 45). In other examples, sensor 52 is a threshold detector, producing a voltage signal that takes a high value when a certain condition is met (e.g., when a sensed distance from the sensor to a component of cargo latch 45 is smaller than a threshold value) and a low value otherwise.

Sensing assembly 50 may further include a logic circuit or processing logic 265 in communication with sensors 52 and with wireless communication circuit 55. Processing logic 265 may include any suitable device or hardware configured to process data by performing one or more logical and/or arithmetic operations (e.g., executing coded instructions). For example, processing logic 265 may include one or more processors, microprocessors, clusters of processing cores, FPGAs (field-programmable gate arrays), and/or any other suitable combination of logic hardware.

Processing logic 265 is configured to control transmission of information sensed by sensors 52, and may be configured to control transmission of the sensed information based on one or more criteria. For example, processing logic 265 may receive sensed information (encoded in, e.g., a voltage signal) from a proximity sensor 52 associated with a distance between a portion of pawl 255 and a portion of latch frame 251. If the sensed information indicates that the portion of pawl 255 is far away from the portion of latch frame 251, and that cargo latch 45 is therefore not in the extended configuration, then processing logic 265 may communicate the sensed information to wireless communication circuit 55 for transmission to central controller 60. Alternatively or additionally, processing logic 265 may communicate a different signal to wireless communication circuit 55, such as a warning signal in response to which central controller 60 is configured to produce human-perceptible information 65 alerting personnel that one or more cargo latches is not in the desired configuration. In some examples, processing logic 265 is omitted and sensors 52 are in direct communication with wireless communication circuit 55.

Wireless communication circuit 55 is configured to wirelessly transmit sensed information and/or a signal corresponding to (e.g., encoding therein) the sensed information to central controller 60. Wireless communication circuit 55 may include an antenna 57 configured to transmit signals (e.g., radio-frequency signals) to central controller 60. Antenna 57 may be a directional antenna or an omnidirectional antenna. Typically, antenna 57 is embedded within or adjacent a component of cargo latch 45, such that the antenna is substantially flush with a surface of the latch, e.g., to avoid damage by cargo containers being loaded and unloaded from cargo hold 35.

In some examples, wireless communication circuit 55 is configured to transmit information using a Bluetooth® wireless technology protocol. Accordingly, central controller 60 may be configured to receive information from a plurality of wireless communication circuits 55 using a Bluetooth® wireless technology protocol. Using a Bluetooth® wireless technology protocol may allow wireless communication circuits 55 to operate in a low-power consumption mode, and may help to prevent interference between the transmissions of the wireless communication circuit and other broadcasting systems of aircraft 40. Other suitable protocols and methods may be utilized.

In some examples, the plurality of wireless communication circuits 55 associated with the plurality of cargo latches 45 in cargo hold 35 (or a subset thereof) comprise a wireless mesh network 269, as shown in FIG. 9. Each wireless communication circuit 55 may be configured to dynamically route signals to central controller 60, either directly or via other wireless communication circuits. Wireless communication circuits 55 may each be configured to receive signals transmitted by any of the other wireless communication circuits in network 269, and to automatically retransmit all (or selected) signals they receive. This automatic relay enables signals transmitted by any wireless communication circuit 55 to ultimately be received by central controller 60. For example, a cargo latch 45 may in some cases be too far away from central controller 60 to directly transmit information to the controller, or the line-of-sight between the wireless communication circuit of that latch 45 and the central controller 60 may be blocked by a cargo container. In these cases, the wireless communication circuit 55 transmits the signal to at least one other wireless communication circuit 55, which in turn transmits the signal to the controller 60 or to at least one other wireless communication circuit 55, which may relay the signal through one or more additional wireless communication circuits 55 (as needed), such that the signal is ultimately transmitted to the central controller 60. In the example depicted in FIG. 9, the wireless communication circuit indicated at 270 is too far from central controller 60 to transmit its signal directly to the controller. However, the signal transmitted by circuit 270 is received by the wireless communication circuit indicated at 271, and circuit 271 transmits the signal to central controller 60. In some examples, wireless communication circuits 55 may be configured to automatically compute a route by which a signal can travel through mesh network 269 and arrive at central controller 60.

Additionally, or alternatively, cargo hold 35 may include one or more dedicated repeaters configured to receive signals from wireless communication circuit 55 and to retransmit the received signals to central controller 60 or to another wireless communication circuit.

Wireless communication circuit 55 may transmit information related to the location of cargo latch 45 within cargo hold 35. The location-related information may be transmitted along with the sensed information by wireless communication circuit 55. For example, each cargo latch 45 may have a unique identifier 275 associated with that latch, and wireless communication circuit 55 may transmit the unique identifier to central controller 60 along with the sensed information. Unique identifiers 275 associated with each cargo latch 45 in cargo hold 35 are stored for reference in central controller 60. For example, central controller 60 may include a memory 280 including a data store 282. Unique identifiers 275 may be stored in the data store 282 in association with location information for each cargo latch 45. The location information may specify that cargo latch 45 is disposed in one section of a plurality of predefined sections of the cargo hold 35, may specify the position of the cargo latch 45 within a specified row of cargo latches 45, or may use any other suitable location reference system.

In response to receiving a signal from wireless communication circuit 55 that includes sensed information and a unique identifier 275, central controller 60 may determine, based on the location information associated with the unique identifier 275, the location of the specific cargo latch 45 associated with the sensed information. Central controller 60 may be configured to display indicia relating to the sensed information (e.g., in association with the respective location information) in a human-readable format. For example, the sensed information may indicate that one of the cargo latches 45 is not in the extended configuration. In response, aircraft personnel may determine the location of the cargo latch 45 in question, based on information displayed by central controller 60, and transition the cargo latch 45 to the extended configuration and/or inspect the latch for problems, etc. Additionally, or alternatively, central controller 60 may convey the sensed information in an audible format, such as an alarm and/or voice alert. The audible format may convey information relating to the location within cargo hold 35 of one or more cargo latches 45 that are not in the extended configuration. Because the association between unique identifiers 275 and the location of the latches 45 is stored in data store 282 of central controller 60, the association can be updated (e.g., when relocating one or more cargo latches 45 to different locations within the cargo hold 35) locally at the central controller 60. Accordingly, this activity does not require modifying each cargo latch 45.

One or more components of sensing assembly 50 (e.g., wireless communication circuit 55) are powered by a battery 70. Battery 70 may include any suitable battery or batteries configured to be rechargeable, such as a lead-acid battery, a lithium-ion battery, a nickel-cadmium battery, and/or the like. Battery 70 may be referred to as a secondary cell. Battery 70 is in communication with a battery-charging circuit 75 including a receiver portion 77 configured to receive power from a wireless power transmission system and convert the received power into an electrical current usable to charge the battery. For example, battery-charging circuit 75 may convert the received power into a DC current.

In some examples, the wirelessly transmitted power is transmitted as an infrared signal (see FIGS. 10-11 and associated description below). In these examples, receiver portion 77 is an infrared receiver. Infrared receiver portion 77 may include a photovoltaic cell, an antenna, a rectifying antenna (also called a rectenna), and/or any other suitable device configured to convert electromagnetic radiation into electrical current.

D. Illustrative Infrared Transmitter

Figure 10:
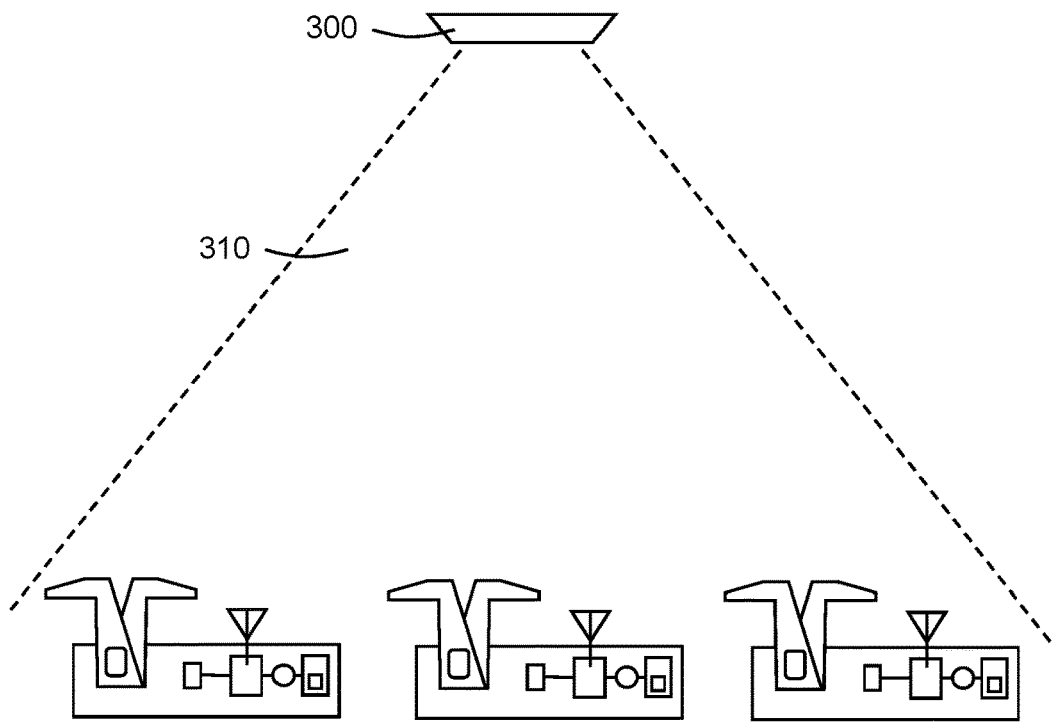
FIG. 10 is a schematic diagram of an illustrative wireless power transmitter illuminating cargo latches with a wide infrared beam, according to aspects of the present teachings.
Figure 11:
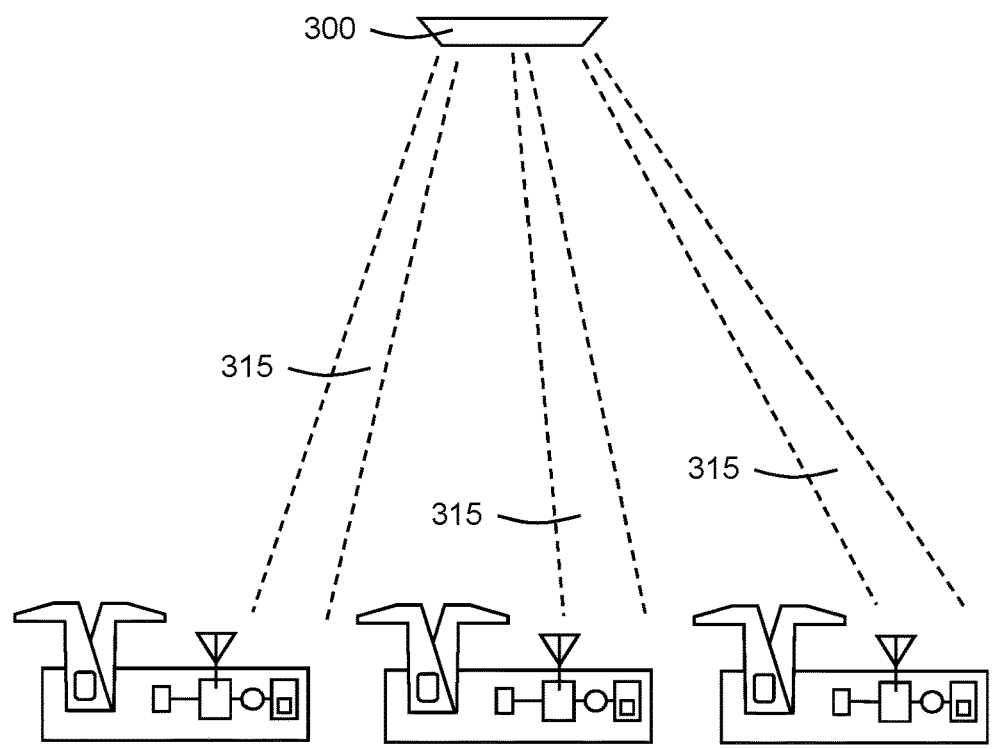
FIG. 11 is a schematic diagram of an illustrative wireless power transmitter illuminating cargo latches with a plurality of narrow infrared beams, according to aspects of the present teachings.

As shown in FIGS. 8 and 10-11, this section describes an illustrative infrared transmitter 300. Infrared transmitter 300 is an example of wireless power transmitter 95, described above.

Infrared transmitter 300 (also called an infrared power transmitter) is configured to transmit infrared light to receiver portion 77, as discussed above. Wireless power signal 100 is therefore, in this example, a wireless infrared power signal, e.g., a beam of infrared light. Infrared transmitter 300 may include one or more infrared emitters, such as light-emitting diodes (LEDs), lasers, lamps, and/or any other suitable device configured to emit infrared light. Infrared transmitter 300 may include optical elements such as lenses, filters, and/or mirrors configured to shape the transmitted light (e.g., by collimating the light or by focusing the light with a desired depth of focus, diameter, and/or divergence). Additionally, or alternatively, infrared transmitter 300 may include a modulating device configured to modulate wireless power signal 100, such that the wireless power signal is a time-varying signal. For example, wireless power signal 100 may be a pulsed signal. Infrared transmitter 300 is connected to wired aircraft electrical system 110, which may receive power from ground-based electrical system 115 or from an onboard power source, such as an auxiliary power unit (APU).

In some examples, infrared transmitter 300 transmits a wide beam 310 of infrared light, illuminating a plurality of sensing assemblies 50 in cargo hold 35 with sufficient intensity to at least partially charge batteries 70 of the illuminated sensing assemblies. Wide beam 310 may, for example, be wide enough to provide power to all of the sensing assemblies 50 in cargo hold 35. Wide beam 310 may include light produced by one infrared emitter within infrared transmitter 300, or by more than one infrared emitter within infrared transmitter 300.

In some examples, infrared transmitter 300 transmits at least one narrow beam 315 of infrared light. Each narrow beam 315 illuminates one or more sensing assemblies 50 with sufficient intensity to at least partially charge the associated batteries 70 (see FIG. 11). For example, cargo hold 35 may include a single infrared transmitter 300 configured to transmit a plurality of narrow beams 315 to the plurality of sensing assemblies 50 within the hold. In other examples, cargo hold 35 includes a plurality of infrared transmitters 300, which are each configured to transmit wireless power to a subset of the plurality of sensing assemblies 50. Cargo hold 35 may include at least one infrared transmitter 300 configured to produce a wide beam 310 and at least one infrared transmitter 300 configured to produce at least one narrow beam 315. Suitable examples of infrared transmitter 300 may include one or more of the infrared transmitters currently sold under the name "WIR TX75 D Infrared Transmitter" by Williams Sound, LLC.

In some examples, the location of cargo latch 45 within cargo hold 35 can be selectively adjusted (e.g., to accommodate different types or sizes of cargo containers). In these examples, infrared transmitter 300 may be configured to track a position of sensing assemblies 50 within cargo hold 35 and, in response to a change in location of a sensing assembly, to redirect wireless power signal 100 to illuminate receiver portion 77 of the sensing assembly. Infrared transmitter 300 may identify the position of sensing assembly 50 by detecting an active marker (e.g., an LED or other light source) or a passive marker (e.g., a retroreflector configured to reflect portions of wireless power signal 100 or a tracking signal emitted by the infrared transmitter) disposed on cargo latch 45. Infrared transmitter 300 may be configured to automatically detect and illuminate any sensing assembly 50 within a predetermined range of the transmitter.

Although the illustrative infrared transmitter 300 discussed above is described as transmitting wireless power signal 100 in the form of infrared light, the transmitter may additionally or alternatively transmit the wireless power signal at another wavelength (e.g., visible wavelengths, microwave wavelengths, or radio wavelengths). For example, wireless power signal 100 may instead be a radio-frequency (RF) signal, and wireless power transmitter 95 may be an RF antenna.

E. Illustrative Method

Figure 12:
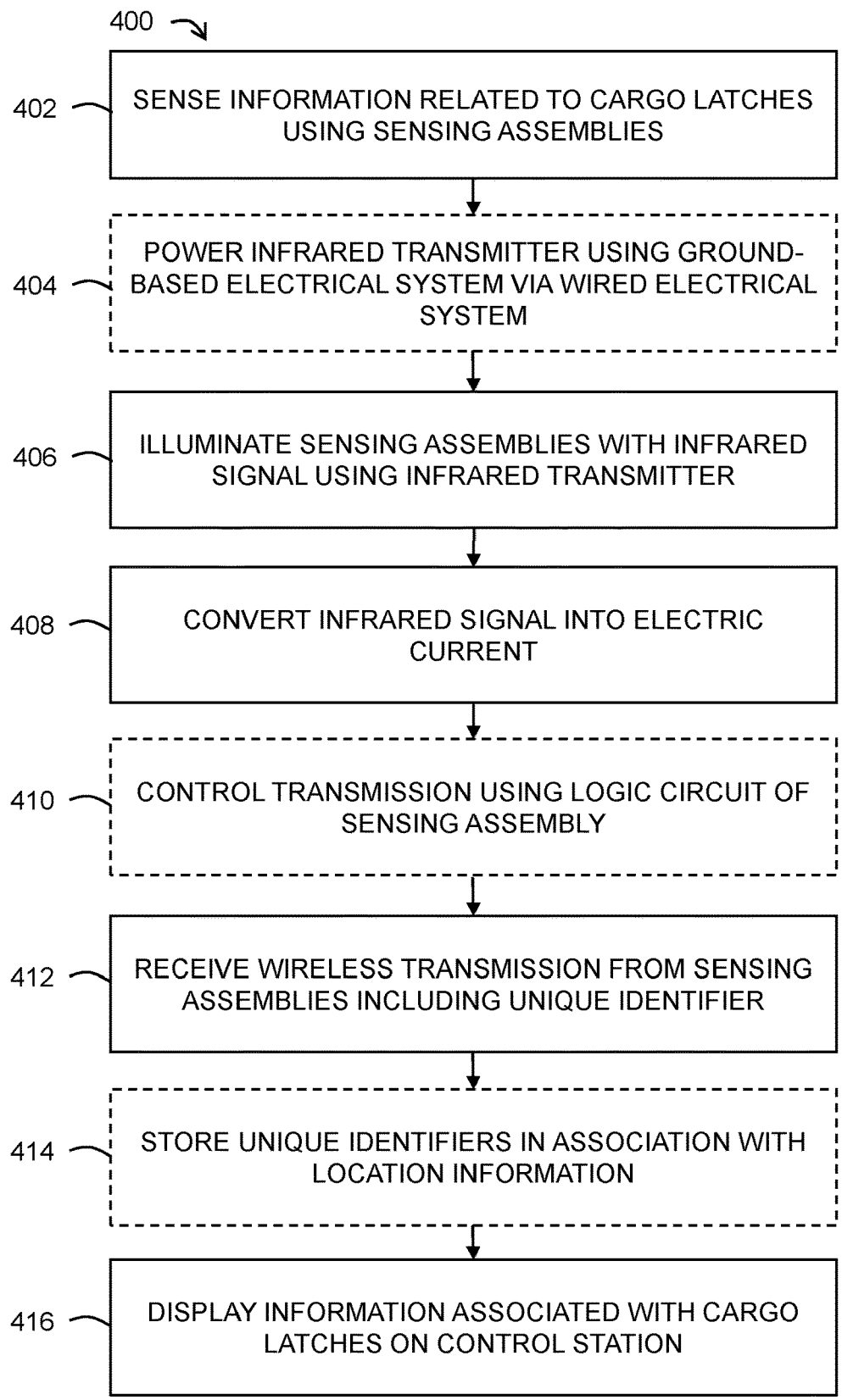
FIG. 12 is a flow chart depicting steps of an illustrative method for cargo restraint according to the present teachings.

This section describes steps of an illustrative method 400 for cargo restraint; see FIG. 12. Aspects of cargo restraint system 30 may be utilized in the method steps described below. Where appropriate, reference may be made to components and systems that may be used in carrying out each step. These references are for illustration, and are not intended to limit the possible ways of carrying out any particular step of the method.

FIG. 12 is a flowchart illustrating steps performed in an illustrative method, and may not recite the complete process or all steps of the method. Although various steps of method 400 are described below and depicted in FIG. 12, the steps need not necessarily all be performed, and in some cases may be performed simultaneously or in a different order than the order shown.

At step 402, the method includes sensing information related to a plurality of cargo latches 45 (e.g., baseplate latches 250) using a plurality of sensing assemblies 50 each associated with one of the cargo latches. Cargo latches 45 are mounted to a floor 47 of an aircraft cargo hold 35 and each include a respective pawl 255. Pawl 255 is transitionable between an extended configuration, in which it restrains cargo, and a retracted configuration, in which it is positioned below the conveyance plane 48 of the cargo compartment 35. Sensing information related to cargo latches 45 may include sensing and/or confirming whether pawl 255 is in the extended configuration to restrain cargo.

At step 404, the method optionally includes powering an infrared transmitter 300 mounted in cargo hold 35 using a wired electrical system 110 of the aircraft. The method may include connecting wired electrical system 110 of the aircraft to a ground-based electrical system 115, such that infrared transmitter 300 is powered by ground-based electrical system 115 via wired electrical system 110 of the aircraft. In this way, infrared transmitter 300 can be powered even when aircraft engines or other power sources are not operating. Alternatively, or additionally, step 404 includes powering infrared transmitter 300 using an auxiliary power unit (APU) of the aircraft.

At step 406, the method includes using infrared transmitter 300 to broadcast wireless power to sensing assemblies 50. For example, infrared transmitter 300 may be used to illuminate sensing assemblies 50 with a time-varying infrared signal. In some examples, infrared transmitter 300 is used to illuminate all of the sensing assemblies 50 substantially simultaneously using a wide infrared beam 310.

At step 408, the method includes converting the infrared signal from infrared transmitter 300 into an electrical current usable to charge battery 70 of sensing assembly 50. Converting the infrared signal into an electrical current may include receiving the infrared signal with a receiver (e.g., receiver portion 77) coupled to battery 70 directly or via components of a battery-charging circuit 75.

At step 410, the method optionally includes using a logic circuit of sensing assemblies 50 (e.g., processing logic 265) to control transmission of information sensed by sensing assemblies 50. For example, sensing assemblies 50 may sense information indicating whether pawl 255 of cargo latch 45 is in the extended configuration, or whether water is present at cargo latch 45. Processing logic 265 of sensing assemblies 50 may be configured to cause the sensed information to be transmitted based on one or more criteria. For example, processing logic 265 may allow transmission of information that indicates a problem at cargo latch 45 (e.g., cargo latch 45 not being in the expected configuration, water or smoke being present at cargo latch 45, etc.) and prevent or limit transmission of information indicating no problem.

At step 412, the method includes receiving a wireless transmission from each of the sensing assemblies 50. Each wireless transmission includes sensed information relating to the cargo latch 45 associated with the sensing assembly 50. The wireless transmission may further include a unique identifier 275 identifying the associated cargo latch 45. The wireless transmission may be received at a central control station 60 of the aircraft. Receiving the wireless transmission may include using a Bluetooth® wireless technology protocol. In some examples, sensing assemblies 50 form a wireless mesh network 269.

At step 414, the method optionally includes storing unique identifiers 275 in association with location information for each of the cargo latches 45 (e.g., information indicating where in cargo hold 35 the cargo latch 45 is located). Unique identifiers 275 and associated location information may be stored in a data store 282 of central control station 60.

At step 416, the method includes displaying human-perceptible information 65 associated with each of the cargo latches 45 on central control station 60 in response to receiving the wireless transmission. Human-perceptible information 65 is based on the sensed information transmitted by sensor assemblies 50. For example, control station 60 may display text, diagrams, and/or icons indicating the sensed configuration of cargo latches 45, sensed amounts of undesired substances such as smoke or water, the remaining charge of the sensor assembly batteries 70, and so on. The displayed human-perceptible information 65 may be monitored by aircraft personnel (e.g., during loading of cargo into cargo hold 35). Central control station 60 may be disposed in cargo hold 35 of the aircraft, and may be configured to transmit information through a communication system of the aircraft to the cockpit or another location in the aircraft.

F. Illustrative Combinations and Additional Examples

This section describes additional aspects and features of cargo restraint systems, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A cargo restraint system comprising a plurality of cargo latches, each of the plurality of cargo latches mounted to a same floor of a cargo hold of an aircraft and including a respective pawl transitionable between an extended configuration and a retracted configuration; a plurality of sensing assemblies, each of the plurality of sensing assemblies associated with a respective one of the plurality of cargo latches, wherein each of the plurality of sensing assemblies includes one or more sensors and a wireless communication circuit powered by a battery in communication with a battery charging circuit, the wireless communication circuit configured to transmit sensed information relating to the associated cargo latch; an infrared transmitter disposed in the cargo hold and configured to illuminate the plurality of sensing assemblies with an infrared signal; wherein each of the battery charging circuits of each of the plurality of sensing assemblies has an infrared receiver portion configured to convert the infrared signal from the infrared transmitter into an electric current usable to charge the battery; and a central controller configured to receive transmissions from each of the wireless communication circuits of the plurality of sensing assemblies and, in response, to produce human-perceptible information associated with each of the cargo latches.

A1. The system of paragraph A0, wherein the infrared transmitter is powered by a ground-based electrical system via a wired electrical system of the aircraft.

A2. The system of any one of paragraphs A0 through A1, wherein the one or more sensors of each of the plurality of sensing assemblies include a first sensor configured to sense whether the pawl is in the extended configuration.

A3. The system of paragraph A2, wherein the first sensor comprises a Hall effect sensor.

A4. The system of any one of paragraphs A0 through A3, wherein the one or more sensors of each of the plurality of sensing assemblies includes a water detector.

A5. The system of any one of paragraphs A0 through A4, each of the plurality of sensor assemblies further comprising processing logic in communication with the one or more sensors and configured to control the transmission of the sensed information.

A6. The system of paragraph A5, wherein the processing logic is further configured to control the transmission of the sensed information based on one or more criteria.

A7. The system of any one of paragraphs A0 through A6, wherein the wireless communication circuit comprises an antenna.

A8. The system of any one of paragraphs A0 through A7, wherein the wireless communication circuit is configured to transmit using a Bluetooth protocol.

A9. The system of any one of paragraphs A0 through A8, wherein each of the plurality of cargo latches has a unique identifier, and the wireless communication circuit is configured to transmit the unique identifier with the sensed information.

A10. The system of paragraph A9, wherein the central controller includes a memory, a data store in the memory containing the unique identifiers stored in association with location information for each of the plurality of cargo latches.

A11. The system of any one of paragraphs A0 through A10, wherein the wireless communication circuits of the plurality of sensing assemblies comprise a mesh network.

A12. The system of any one of paragraphs A0 through A11, wherein the infrared transmitter is configured to illuminate the plurality of sensing assemblies substantially simultaneously using a wide beam.

A13. The system of any one of paragraphs A0 through A11, wherein the infrared transmitter is configured to illuminate the plurality of sensing assemblies using a corresponding plurality of narrow infrared beams.

A14. The system of any one of paragraphs A0 through A11, wherein the infrared transmitter is configured to illuminate the plurality of sensing assemblies individually.

A15. The system of any one of paragraphs A13 through A14, wherein the infrared transmitter is configured to track a position of each of the plurality of sensing assemblies.

A16. The system of any one of paragraphs A0 through A15, wherein the infrared signal is time-varying.

B0. A method comprising sensing information related to a plurality of cargo latches, each of the plurality of cargo latches mounted to a same floor of a cargo hold of an aircraft and including a respective pawl transitionable between an extended configuration and a retracted configuration, using a plurality of sensing assemblies each associated with a respective one of the plurality of cargo latches; illuminating the plurality of sensing assemblies with an infrared signal, using an infrared transmitter disposed in the cargo hold; converting the infrared signal from the infrared transmitter into an electric current usable to charge a respective battery of each of the plurality of sensing assemblies; receiving a wireless transmission from each of the plurality of sensing assemblies, each transmission including sensed information relating to the associated cargo latch; and in response to receiving the wireless transmission, producing human-perceptible information associated with each of the cargo latches at a central control station.

B1. The method of paragraph B0, wherein the central control station is disposed in the cargo hold.

B2. The method of any one of paragraphs B0 through B1, wherein the sensed information comprises information indicating whether the pawl is in the extended configuration.

B3. The method of any one of paragraphs B0 through B2, further comprising powering the infrared transmitter using a ground-based electrical system via a wired electrical system of the aircraft.

B4. The method of any one of paragraphs B0 through B3, wherein the sensed information comprises information indicating whether there is water detected at the cargo latch.

B5. The method of any one of paragraphs B0 through B4, further comprising controlling transmission of the sensed information based on one or more criteria using respective processing logic of each of the plurality of sensing assemblies.

B6. The method of any one of paragraphs B0 through B5, wherein receiving a wireless transmission from each of the plurality of sensing assemblies includes using a Bluetooth protocol.

B7. The method of any one of paragraphs B0 through B6, wherein receiving a wireless transmission from each of the plurality of sensing assemblies includes receiving a unique identifier of the associated cargo latch.

B8. The method of paragraph B7, further comprising storing the unique identifiers in association with location information for each of the plurality of cargo latches.

B9. The method of any one of paragraphs B0 through B8, wherein the sensing assemblies form a wireless mesh network.

B10. The method of any one of paragraphs B0 through B9, wherein the infrared transmitter is configured to illuminate the plurality of sensing assemblies substantially simultaneously using a wide beam.

C0. A cargo restraint system comprising a plurality of cargo latches, each of the plurality of cargo latches mounted to a same floor of an aircraft cargo hold; a plurality of sensing assemblies, each of the plurality of sensing assemblies associated with a respective one of the plurality of cargo latches, wherein each of the plurality of sensing assemblies includes one or more sensors and a wireless communication circuit powered by a battery in communication with a battery charging circuit, the wireless communication circuit configured to transmit sensed information relating to the associated cargo latch; and an infrared transmitter disposed in the cargo hold and configured to illuminate the plurality of sensing assemblies with an infrared signal; wherein each of the battery charging circuits of each of the plurality of sensing assemblies has an infrared receiver portion configured to convert the infrared signal from the infrared transmitter into an electric current usable to charge the battery.

C1. The system of paragraph C0, wherein each of the plurality of cargo latches includes a pawl transitionable between an extended configuration and a retracted configuration.

C2. The system of paragraph C1, wherein the pawl is a first pawl, each of the plurality of cargo latches further comprising a second pawl, wherein the first and second pawls are oriented in opposing directions.

C3. The system of any one of paragraphs C0 through C2, further comprising a central controller configured to receive transmissions from each of the wireless communication circuits of the plurality of sensing assemblies and, in response, to display human-perceptible information associated with each of the cargo latches.

C4. The system of paragraph C3, wherein the central controller is disposed in the cargo hold.

C5. The system of any one of paragraphs C0 through C4, wherein each of the plurality of sensing assemblies includes a Hall effect sensor configured to sense a position of the cargo latch.

Advantages, Features, and Benefits

The different embodiments and examples of the cargo restraint system described herein provide several advantages over known solutions for ensuring proper restraint of cargo within an aircraft cargo hold. For example, illustrative embodiments and examples described herein allow cargo latches to be monitored for proper configuration much more quickly and accurately than can be done using manual inspection.

Additionally, and among other benefits, illustrative embodiments and examples described herein allow continuous real-time monitoring of aircraft cargo latches to detect problems immediately during cargo loading and during flight, when manual inspection would be difficult or impossible.

Additionally, and among other benefits, illustrative embodiments and examples described herein allow wireless power transmission to sensor assemblies within a cargo hold, avoiding the additional weight and complexity associated with electrical wires connected to the sensor assemblies.

Additionally, and among other benefits, illustrative embodiments and examples described herein allow a cargo hold sensor assembly system that can easily be retrofitted in an existing cargo hold, and can easily be adapted when cargo latches are moved to different locations within the hold.

Additionally, and among other benefits, illustrative embodiments and examples described herein allow collection and saving of sensed data related to an aircraft cargo hold that may be used to troubleshoot an event or problem with the aircraft.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A cargo restraint system comprising:
a plurality of cargo latches, each of the plurality of cargo latches mounted to a same floor of a cargo hold of an aircraft and including a respective pawl transitionable between an extended configuration and a retracted configuration;
a plurality of sensing assemblies, each of the plurality of sensing assemblies associated with a respective one of the plurality of cargo latches, wherein each of the plurality of sensing assemblies includes one or more sensors and a wireless communication circuit powered by a battery in communication with a battery charging circuit, the wireless communication circuit configured to transmit sensed information relating to the associated cargo latch;
an infrared transmitter disposed in the cargo hold and configured to illuminate the plurality of sensing assemblies with an infrared signal; and
a central controller configured to receive transmissions from each wireless communication circuit of the plurality of sensing assemblies and, in response, to produce human-perceptible information associated with each of the cargo latches;
wherein each battery charging circuit of each of the plurality of sensing assemblies has an infrared receiver portion configured to convert the infrared signal from the infrared transmitter into an electric current usable to charge the battery.

2. The system of claim 1, wherein the infrared transmitter is powered by a ground-based electrical system via a wired electrical system of the aircraft.

3. The system of claim 1, wherein the one or more sensors of each of the plurality of sensing assemblies include a first sensor configured to sense whether the respective pawl is in the extended configuration.

4. The system of claim 1, wherein the one or more sensors of each of the plurality of sensing assemblies includes a water detector.

5. The system of claim 1, each of the plurality of sensing assemblies further comprising processing logic in communication with the one or more sensors and configured to control the transmission of the sensed information.

6. The system of claim 1, wherein the wireless communication circuit is configured to transmit using a Bluetooth protocol.

7. The system of claim 1, wherein each of the plurality of cargo latches has a unique identifier, and the wireless communication circuit is configured to transmit the unique identifier with the sensed information.

8. The system of claim 7, wherein the central controller includes a memory, a data store in the memory containing the unique identifiers stored in association with location information for each of the plurality of cargo latches.

9. The system of claim 1, wherein the wireless communication circuits of the plurality of sensing assemblies comprise a mesh network.

10. The system of claim 1, wherein the infrared transmitter is configured to illuminate the plurality of sensing assemblies individually.

11. The system of claim 10, wherein the infrared transmitter is configured to track a position of each of the plurality of sensing assemblies.

12. The system of claim 1, wherein the infrared signal is time-varying.

13. A method comprising:
  sensing information related to a plurality of cargo latches, each of the plurality of cargo latches mounted to a same floor of a cargo hold of an aircraft and including a respective pawl transitionable between an extended configuration and a retracted configuration, using a plurality of sensing assemblies each associated with one of the plurality of cargo latches;
  illuminating the plurality of sensing assemblies with an infrared signal, using an infrared transmitter disposed in the cargo hold;
  converting the infrared signal from the infrared transmitter into an electric current usable to charge a respective battery of each of the plurality of sensing assemblies;
  receiving a wireless transmission from each of the plurality of sensing assemblies, each transmission including sensed information relating to the associated cargo latch; and
  in response to receiving the wireless transmission, producing human-perceptible information associated with each of the plurality of cargo latches at a central control station.

14. The method of claim 13, further comprising controlling transmission of the sensed information based on one or more criteria, using respective processing logic of each of the plurality of sensing assemblies.

15. The method of claim 13, wherein receiving a wireless transmission from each of the plurality of sensing assemblies includes receiving a unique identifier of the associated cargo latch.

16. The method of claim 13, wherein the infrared transmitter is configured to illuminate the plurality of sensing assemblies substantially simultaneously using a wide beam.

17. A cargo restraint system comprising:
  a plurality of cargo latches, each of the plurality of cargo latches mounted to a same floor of an aircraft cargo hold;
  a plurality of sensing assemblies, each of the plurality of sensing assemblies associated with a respective one of the plurality of cargo latches, wherein each of the plurality of sensing assemblies includes one or more sensors and a wireless communication circuit powered by a battery in communication with a battery charging circuit, the wireless communication circuit configured to transmit sensed information relating to the associated cargo latch; and
  an infrared transmitter disposed in the cargo hold and configured to illuminate the plurality of sensing assemblies with an infrared signal;
  wherein each of the battery charging circuits of each of the plurality of sensing assemblies has an infrared receiver portion configured to convert the infrared signal from the infrared transmitter into an electric current usable to charge the battery.

18. The system of claim 17, wherein each of the plurality of cargo latches includes a pawl transitionable between an extended configuration and a retracted configuration.

19. The system of claim 17, further comprising a central controller configured to receive transmissions from each of the wireless communication circuits of the plurality of sensing assemblies and, in response, to produce human-perceptible information associated with each of the cargo latches.

20. The system of claim 17, wherein each of the plurality of sensing assemblies includes a Hall effect sensor configured to sense a position of the cargo latch.

* * * * *